H. O. KING.
COTTON BALE COVERING.
No. 418,620. Patented Dec. 31, 1889.
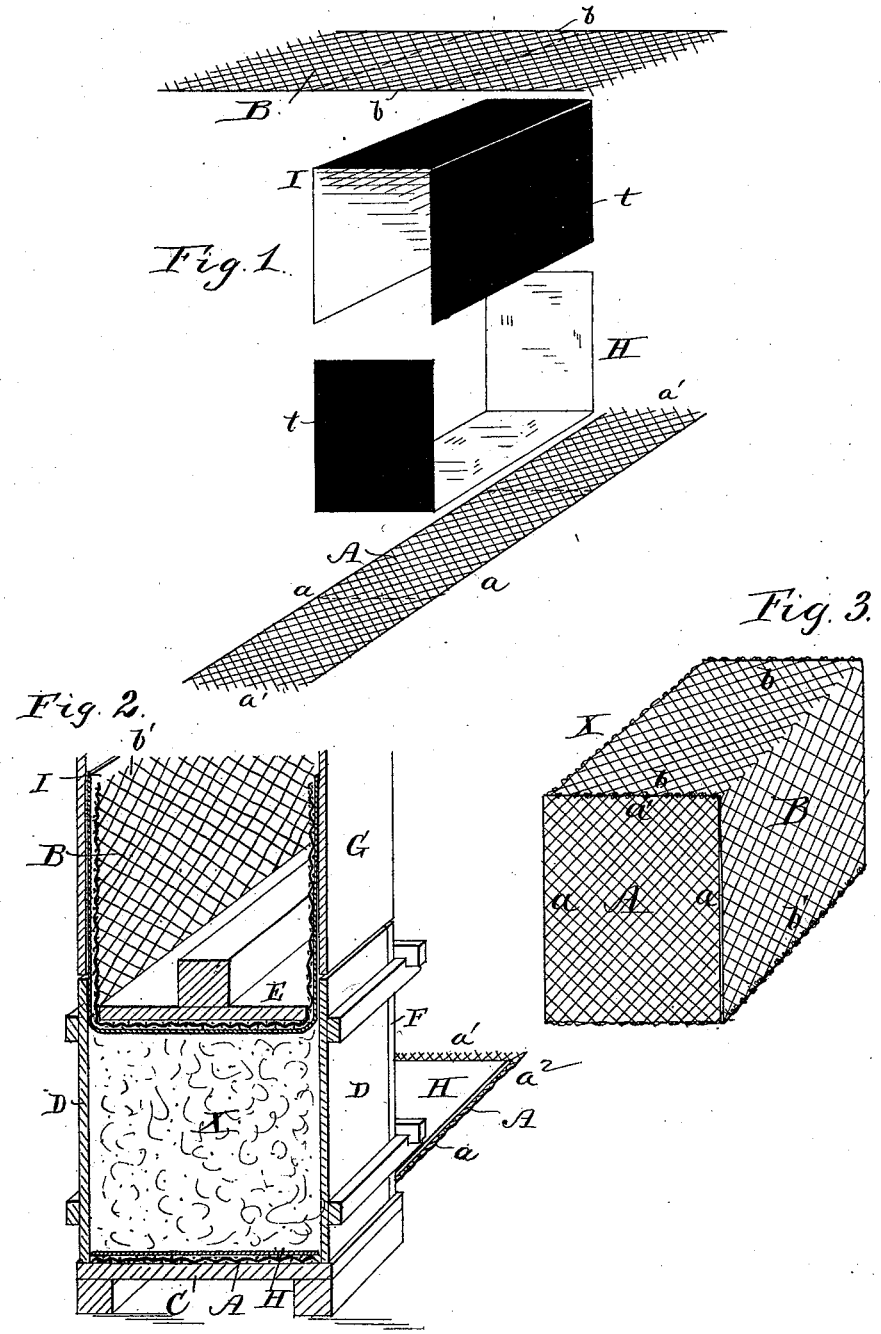

UNITED STATES PATENT OFFICE.

HEZEKIAH O. KING, OF GREENVILLE, SOUTH CAROLINA.

COTTON-BALE COVERING.

SPECIFICATION forming part of Letters Patent No. 418,620, dated December 31, 1889.

Application filed September 18, 1889. Serial No. 324,341. (No model.)

*To all whom it may concern:*

Be it known that I, HEZEKIAH O. KING, a citizen of the United States, residing at Greenville, in the county of Greenville and State of South Carolina, have invented certain new and useful Improvements in Cotton-Bale Coverings; and I do declare the following to be a full, clear, and exact description of the invention, such as will enable others skilled in the art to which it appertains to make and use the same.

My invention relates to means for protecting and securing cotton when formed and compressed into bales.

It is the object of the invention to provide a combined covering and bale-tie which may conveniently be applied to the bale as it is pressed, which will effectively secure the bale, doing away with the necessity of other ties, which will entirely cover and protect the cotton against damage from any ordinary exposure to fire or water and against dirt or mud while being handled in shipping, which will prevent accidental loss or waste from the bale, but will not interfere with the ordinary operation of sampling, which will permit of the bales being still further compressed or doubled for shipment without removal of the cover, and, finally, which will be cheap and therefore adapted for practical use.

With these objects in view my invention consists in those parts and combinations thereof hereinafter particularly set forth and claimed, without, however, being limited to the exact details which, for the sake of illustration, I have shown and described.

In order to make my invention more clearly understood, I have shown in the accompanying drawings means for carrying the same into practical effect.

In said drawings, Figure 1 is a perspective view showing the manner of shaping and applying to a cotton-bale the different parts of a covering embodying my invention. Fig. 2 is a sectional perspective view of a press, illustrating the manner of applying the covering as the cotton is pressed and baled. Fig. 3 is a perspective view of a completed and covered bale.

Referring to the drawings, A indicates a rectangular piece of wire-netting, preferably galvanized, and of such coarse mesh—say one and one-half or two inches—as to permit of the ready introduction of the sampling-tool. The piece is of a length equal to the length and twice the height of the bale and of a width equal to the width of the bale, and has upon its sides two finished or selvage edges $a$ and upon its ends two raw edges $a'$. This piece A is designed to inclose the bottom and two ends of the bale X.

B is a piece of similar material, also of a rectangular shape, but of a length equal to the width and twice the height of the bale and of a width equal to the length of the bale. Upon its longer sides it has two selvage edges $b$ and upon its ends two raw edges $b'$. This piece B is designed to cover the top and two sides of the bale. When these pieces are brought together around the bale and the raw edges $a'$ $b'$ united with the selvage edges $b$ $a$, to which they will be opposed, the bale will be completely inclosed and securely held. I preferably unite said edges by twisting the projecting wires of the raw edges around the selvage wire of the edges $a$ $b$; but the union may be effected by a separate wire or wires passed back and forth through the meshes of the meeting edges.

In Fig. 2 I have illustrated the preferred manner of applying this covering as the bale is pressed, enough of a cotton-press being shown in said figure to make the manner of such application clearly understood, the parts being in the position which they will assume when the platen is down, the bale compressed, and the sides or doors of the bale-box ready to be removed.

Referring to Fig. 2, C is the floor of the bale-box; D D, the side doors; E, the platen; F, one of the end doors, and G the press-box, of a cotton-press of ordinary construction. Upon the floor C is placed the narrower piece A of the netting, with its ends projecting from each end of the bale-box, as indicated at $a^2$, a distance equal to the height of the bale which is to be formed. The doors D F are then placed in position and the cotton is filled into the press-box. The wider piece B of the netting is then placed over the top of the cotton, with its ends extending over the sides of the press-box, and the platen is forced down to the position shown in Fig. 2. The doors D F are then opened or removed, the ends of the piece B drawn down out of the press and secured to the selvage edges of the piece A along the lower edges of the sides of the bale, and the ends of the piece A raised and similarly secured along the upper edges of the ends of the bale to the selvages of piece B. The platen is then released and the finished bale rolled out of the bale-box.

For water and fire proofing, and for protection against dirt, I have combined with the above-described cover and tie an envelope of suitable material—such as asbestus paper, paper made from the bark of cotton-stalks or from other material and having an external water and fire proof coating $t$. Said envelope is in two pieces H I, of the same shape and size as the wire-netting pieces A and B. These pieces are applied beneath the netting and next to the cotton, as indicated in Fig. 1, and when in place will be folded, as shown in said figure. The top and bottom pieces of netting are indicated at B A, respectively, above and below the pieces H I, and are shown flat, their lines of folding being indicated by dotted lines. Before the cotton is pressed the pieces H I are placed above and below the pieces of netting A B, as indicated in Fig. 2, and will be held against the cotton so as to cover it completely when the netting is tied, as already described. When it is desired to further compress or to double for shipment bales of cotton which are inclosed and tied by the above-described covering, it is not necessary to remove the latter. It is simply necessary to place the covered bale or bales in the press, reduce it or them to the required dimension, and then tie the bales in any desired manner. This will produce a slackness in the wire covering at the sides of the bale, which may be taken up by passing a wire back and forth like a lacing through the meshes of the netting and drawing the latter tight. When a single bale is compressed and the slack taken up in this manner, additional ties for securing the bales may in some cases be dispensed with.

What I claim is—

1. A cotton-bale covering consisting of two pieces of wire-netting—the one covering the bottom and the two ends of the bale and the other covering the top and two sides—said pieces being united by wires along the end and bottom edges, substantially as set forth.

2. A cotton-bale covering consisting of two pieces of wire-netting—the one covering the bottom and two ends of the bale and having two selvages along the bottom of the bale, and the other covering the top and two sides of the bale and having two selvages along the upper end edges of the bale—said pieces being united by the connection of the wires of the ends of the raw edges with the said selvages, substantially as set forth.

3. A cotton-bale covering consisting of two sheets of fire and water proof material—such as paper or equivalent substance—the one shaped to cover the bottom and two ends of the bale and the other shaped to cover the top and two sides of the bale—and of two similarly-shaped pieces of wire-netting inclosing the said sheets and united by wires along the end and bottom edges of the bale, substantially as set forth.

In testimony whereof I affix my signature in the presence of two witnesses.

HEZEKIAH O. KING.

Witnesses:
H. N. LOW,
E. M. DAWSON.